US010647317B2

(12) United States Patent
Konishi

(10) Patent No.: US 10,647,317 B2
(45) Date of Patent: May 12, 2020

(54) AUTOMATIC TRAVELING CONTROL SYSTEM AND SERVER DEVICE

(71) Applicant: HONDA MOTOR CO., LTD., Minato-ku, Tokyo (JP)

(72) Inventor: Hitoshi Konishi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 179 days.

(21) Appl. No.: 15/990,971

(22) Filed: May 29, 2018

(65) Prior Publication Data
US 2018/0345962 A1 Dec. 6, 2018

(30) Foreign Application Priority Data

Jun. 2, 2017 (JP) .................................. 2017-110246

(51) Int. Cl.
B60W 50/14 (2020.01)
B60W 30/10 (2006.01)
B60W 50/00 (2006.01)

(52) U.S. Cl.
CPC ............ B60W 30/10 (2013.01); B60W 50/14 (2013.01); B60W 2050/0072 (2013.01); B60W 2420/42 (2013.01); B60W 2550/402 (2013.01); B60W 2710/1038 (2013.01); B60W 2710/18 (2013.01); B60W 2710/20 (2013.01)

(58) Field of Classification Search
CPC ......... B60W 50/14; B60W 2050/0072; B60W 2550/402; B60W 30/10
See application file for complete search history.

(56) References Cited

U.S. PATENT DOCUMENTS

2018/0157264 A1* 6/2018 Isaacs ...................... G08G 1/00
2018/0292833 A1* 10/2018 You ....................... B60W 30/182
2018/0299274 A1* 10/2018 Moghe ................... G01C 21/32

FOREIGN PATENT DOCUMENTS

| JP | 10-214398 | 8/1998 |
|---|---|---|
| JP | 2006-052973 | 2/2006 |
| JP | 2008-087726 | 4/2008 |
| JP | 2014-067165 | 4/2014 |
| JP | 2015-230573 | 12/2015 |
| JP | 2016-153832 | 8/2016 |
| JP | 2016-192028 | 11/2016 |

(Continued)

OTHER PUBLICATIONS

Japanese Office Action for Japanese Patent Application No. 2017-110246 dated Mar. 5, 2019.

Primary Examiner — Todd M Melton
(74) Attorney, Agent, or Firm — Amin, Turocy & Watson, LLP

(57) ABSTRACT

An automatic traveling control system includes a vehicle control device configured to control an automatic traveling of a vehicle on the basis of a road structure map stored in a storage device, a reception device configured to receive change information of the road structure map from an outside, and an update device configured to update the road structure map on the basis of the change information. In a case where the change information is information indicating a temporary change of a predetermined section included in the road structure map, the road structure map is not updated and the automatic traveling of the vehicle is limited in the predetermined section.

5 Claims, 2 Drawing Sheets

(56) References Cited

FOREIGN PATENT DOCUMENTS

| JP | 2017-087816 | 5/2017 |
|----|-------------|--------|
| JP | 2017-090548 | 5/2017 |
| WO | 2016/139748 | 9/2016 |

* cited by examiner

AUTOMATIC TRAVELING CONTROL SYSTEM AND SERVER DEVICE

CROSS-REFERENCE TO RELATED APPLICATION

Priority is claimed on Japanese Patent Application No. 2017-110246, filed Jun. 2, 2017, the content of which is incorporated herein by reference.

BACKGROUND OF THE INVENTION

Field of the Invention

The present invention relates to a control system of a vehicle, and particularly to an automatic traveling control system for controlling automatic traveling of a vehicle.

Description of Related Art

In recent years, the development of an automatic traveling control system that automatically controls the output, the steering, and the braking of a vehicle has progressed. In such an automatic traveling control system, automatic traveling of the vehicle is controlled on the basis of a high-precision map stored in a storage device. Since information included in the high-precision map readily changes due to, for example, a roadwork, an update device that is able to update the high-precision map in the vehicle to the latest data distributed from an external server has been proposed.

For example, Japanese Unexamined Patent Application, First Publication No. 2016-153832 (hereinafter referred to as Patent Literature 1) discloses a map data storage device that receives map data including changed aspects such as a lane that is temporarily unavailable due to a road construction or the like from a server and updates the map data.

However, in the map data storage device disclosed in Patent Literature 1, for example, every time a roadwork and restrictions on traffic accompanying the roadwork occur, a process of updating the high-accuracy map with respect to an entire section may be executed even in cases for a trivial roadwork in which the shape of a road is not changed.

In such a case, since a large amount of updated data of the high-precision map is to be downloaded from a server, an excessive load is concentrated on the server that transmits the update information to a vehicle and a central processing unit (CPU) that executes the update process of the high-precision map in the vehicle.

In particular, since the high-precision map includes road information including a large amount of data, if the map data is frequently updated to include a trivial road construction, the amount of updated data is excessively large. Therefore, communication costs between the server that transmits the updated data and the vehicle that receives the updated data increases, and the capability of an update system for a road network map may be reduced in some cases due to the facility of the server being thereby occupied to a certain extent.

SUMMARY OF THE INVENTION

From such a background, in an automatic traveling control system that controls automatic traveling of a vehicle using a high-precision map, it is desired to realize an automatic traveling control system capable of reducing an update cost of the high-precision map and preventing reduction in capability of an update system.

(1) An automatic traveling control system of an aspect of the present invention includes a vehicle control device configured to control an automatic traveling of a vehicle on the basis of a road structure map stored in a storage device, a reception device configured to receive change information of the road structure map from outside, and an update device configured to update the road structure map on the basis of the change information. In a case where the change information is information indicating a temporary change of a predetermined section included in the road structure map, the road structure map is not updated and the automatic traveling of the vehicle is limited in the predetermined section.

(2) In the aspect of (1) described above, in a case where the predetermined section is included in an automatic traveling section of the vehicle, at least part of functions of the automatic traveling may be limited so as to be changed to a manual driving before reaching the predetermined section.

(3) In the aspect of (1) or (2) described above, in a case where the predetermined section is included in an automatic traveling section of the vehicle, after passing the predetermined section and traveling a predetermined distance, the limitation of the automatic traveling may be released.

(4) In one of the aspects of (1) to (3) described above, in a case where the change information is information indicating a change in a shape of a road in the road structure map, the road structure map may be updated on the basis of the change information.

(5) A server device of an aspect of the present invention distributes change information of a road structure map to a vehicle including an automatic traveling control system that controls an automatic traveling on the basis of the road structure map. In a case where the change information is information indicating a temporary change of a predetermined section included in the road structure map, the server device distributes information for restricting the automatic traveling of the vehicle in the predetermined section.

DETAILED DESCRIPTION OF THE INVENTION

Hereinafter, embodiments of the present invention will be described with reference to the drawings. In addition, in the embodiment of the present invention, an automatic traveling control system mounted on a vehicle is described as an example of an automatic traveling control system according to the present invention, but a configuration of the automatic traveling control system according to the present invention is not limited thereto, and may also be widely applied to cases where an automatic traveling control system is mounted on general moving bodies.

Figure 1:
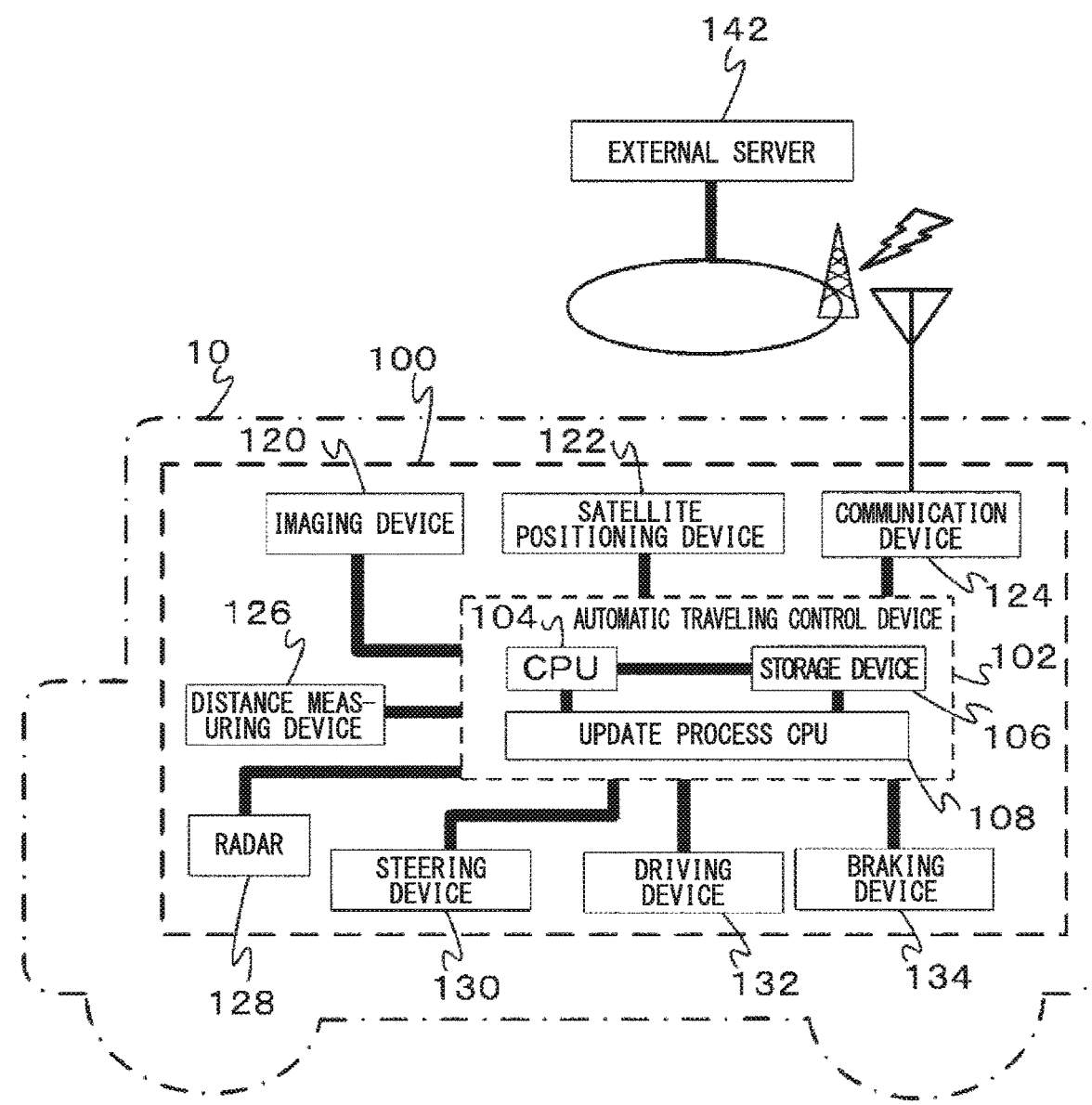
FIG. 1 is a block diagram illustrating a configuration of a vehicle including an automatic traveling control system according to an embodiment of the present invention.

First, a configuration of the automatic traveling control system that controls an automatic traveling of a vehicle according to the present invention will be described. FIG. 1 is block diagram illustrating the configuration of a vehicle 10 including an automatic traveling control system 100 according to the embodiment of the present invention.

The automatic traveling control system 100 includes an automatic traveling control device 102, detection equipment outputting a detection signal to the automatic traveling control device 102 and including an imaging device 120, a satellite positioning device 122, a communication device 124, a distance measuring device 126, a radar 128, and the like, and traveling operation equipment operating on the basis of a signal output from the automatic traveling control device 102 and including a steering device 130, a driving device 132, a braking device 134, and the like.

For example, the imaging device 120 may be a camera including an optical element such as a lens, a solid imaging element such as a complementary metal oxide semiconductor (CMOS) sensor, and the like. For example, the imaging device 120 is provided on a plurality of places inside and outside the vehicle including a rear side of an interior mirror, a vicinity of an upper end of a windshield, and the like, and constantly images other vehicles, obstacles, signs, a road surface, and the like around the vehicle 10.

The satellite positioning device 122 includes a global navigation satellite system (GNSS) receiver or the like, and detects a current position of the vehicle 10. The detected current position of the vehicle is output to the automatic traveling control device 102 and used for guiding the vehicle 10 on a set traveling route. In addition, for example, even in a case where a position of a subject vehicle is displayed on a screen map of a car navigation system mounted in the vehicle, or traveling history information stored in the storage device 106 is generated, and the like, information output from the satellite positioning device 122 is used.

The communication device 124 performs wireless communication, is connected to an external server 142 through the Internet or the like, and receives the latest road structure map from the external server 142 to update the road structure map to the latest state or to receive the latest traffic information or the like. In addition, the communication device 124 includes a communication function for local area network (LAN), and accesses the Internet or the like through an access point or the like in a surrounding public wireless LAN. For example, the communication device 124 may obtain facilities information or the like for a vicinity of the vehicle such as a parking lot or a shopping center.

For example, the distance measuring device 126 may include using laser imaging detection and ranging (LIDAR) in which an object such as an obstacle in front of the vehicle 10 or an object such as a vehicle is irradiated with laser light in a pulse state, and measures a time until scattered light of the laser light returns. For example, the distance measuring device 126 is provided on a plurality of places such as a front surface and a side surface of a vehicle body.

For example, the radar 128 measures a distance between its own vehicle and a preceding vehicle by temporally changing a frequency of millimeter waves using a frequency modulated continuous wave (FMCW) method. For example, the radar 128 is provided on the front surface of the vehicle body.

The steering device 130 controls a traveling direction of the vehicle 10. For example, the steering device 130 includes a steering gear mechanism of a rack and pinion type constituted of a pinion provided at one end of a steering shaft and a rack provided in a steering gear box. The steering device 130 includes a motor connected to the pinion. The motor is driven so as to have a steering angle set by the automatic traveling control device 102, and thus a steering of the vehicle 10 is controlled.

For example, the driving device 132 includes either one or both of an engine and a motor, and includes an electronic control unit (ECU) for controlling the engine and/or the motor. The ECU controls an output of the engine and/or the motor on the basis of set values output from the automatic traveling control device 102, and thus driving of the vehicle 10 is controlled.

For example, the braking device 134 includes a brake actuator or the like that adjusts a braking force of each wheel of the vehicle 10. The brake actuators of each wheel operate on the basis of a set value output from the automatic traveling control device 102, and thus a brake of the vehicle 10 is controlled.

Next, the automatic traveling control device 102 constituting part of the automatic traveling control system 100 according to the present embodiment will be described. The automatic traveling control device 102 includes a central processing unit (CPU) 104 that is a signal processing device, the storage device 106 including a read only memory (ROM) in which a program is recorded, a random access memory (RAM) for temporarily storing data such as information on the high-precision map and route information, and the like, an update process CPU 108 that performs a determination of a necessity or non-necessity for the map update and an update process, and the like. The automatic traveling control device 102 determines an output signal to the traveling operation device equipment including the steering device 130, the driving device 132, the braking device 134, and the like on the basis of the detection signal output from the detection equipment such as the imaging device 120, the satellite positioning device 122, the communication device 124, the distance measuring device 126, and the radar 128.

In addition, a process according to the following embodiment executed in the automatic traveling control system 100 of the present invention is controlled, for example, by executing a program with the automatic traveling control device 102 that is a computer. In addition, the computer program executed by the automatic traveling control device 102 may be stored in the ROM of the storage device 106, of arbitrary computer-readable storage medium, or the like.

The CPU 104 controls the vehicle 10 according to a control mode (for example, an automatic driving mode or a manual driving mode) selected by a user of the vehicle 10. For example, in a case where the automatic driving mode is selected, for example, the CPU 104 of the automatic traveling control device 102 predicts a future state of the vehicle 10 in a predetermined section on the basis of a detection result output from each detection device at the time of traveling and the road structure map stored in the storage device 106 to optimize a travel trajectory of the vehicle 10. In addition, the CPU 104 generates an action plan including a plurality operation processes (for example, deceleration or acceleration of the vehicle, and changing/remaining in lane) so that the optimized traveling trajectory is executed in a predetermined section, and sequentially executes the operation processes according to the action plan, to cause the vehicle 10 to perform automatic traveling.

In addition, even in a case where the automatic driving mode is selected, in a case where an abnormality or a problem is detected by a detection equipment such as the imaging device 120 or an operation device such as the steering device 130, the CPU 104 outputs a signal that instructs stopping part or all of the automatic driving functions. When each of devices of the vehicle 10 received this signal, for example, a car navigation system mounted on the vehicle notifies a driver of the vehicle 10 that a driving operation is to be transferred through a display on a screen or a speaker of the car navigation system, and prompts manual driving by the driver. In a case where it is impossible to transfer to manual driving by the driver, the vehicle 10 is automatically moved to a safe place in a vicinity of the vehicle 10 quickly and stopped. Alternatively, an automatic driving function of part of the automatic driving (for example, only a steering function by the steering device 130) may be forcibly stopped.

As the storage device 106, for example, arbitrary storage means such as a solid state drive (SSD) including a semiconductor memory such as a NAND flash memory, and a magnetoresistive memory such as a magnetoresistive random access memory (MRAM), or a hard disk drive (HDD) may be used. In addition, a plurality of storage means in combination (for example, using the flash memory and the HDD together) may be used according to a use. A plurality of storage means may be disposed in a housing constituting the storage device 106, and each storage means may be selectively used as occasion demands.

In the storage device 106, in addition to the temporary storage data such as a program executed by the CPU 104 or the route information, the road structure map used in the automatic driving of the vehicle is stored. The road structure map is a high-precision map, and includes data of a position, a size, and a shape of each part configuring a road. For example, the road structure map includes data related to information (a shape, a lane type, and lane width information) on painted patterns (a lane, a stop line, a crosswalk) painted on the road surface of the road, together with numerical data representing the position or the shape of part of a road constituting a road such as a curb of a road, an object provided on a road (for example, a sign, a signal, a utility pole, a pole, or the like) with an error of about several centimeters.

Since the road structure map of the configuration described above is used for generating the action plan of the vehicle 10 and controlling the automatic traveling, it is preferable that the road structure map is always maintained as the latest road structure map. However, the high-precision map includes road information of a large amount of data. Therefore, for example, in a case where the update process of the high-precision map is executed even with respect to a section temporarily changed due to a trivial road construction by which the shape of the road is not changed, a frequency of updating the road structure map of the vehicle 10 by downloading updated data from the external server 142 increases. Thus, a cost of communication between the server device 142 and the vehicle 10 increases, and an excessive load is concentrated on the external server 142, the communication device 124 of the vehicle 10, the update process CPU 108, and the like. As a result, the overall capacity of an update system of the road structure map may be reduced.

In order to solve such a situation, in particular, the automatic traveling control system 100 according to the present embodiment has functions of determining whether or not a change in a road due to a road construction or the like is temporary, and in a case where the change of the road is temporary, performing a process so as not to update the road structure map of the section including the change. Hereinafter, a specific update procedure of the road structure map executed by the automatic traveling control system 100 having this function will be described with reference to a flowchart shown in FIG. 2. In addition, for example, the present process is started according to starting of an engine of the vehicle by the user of the vehicle 10 and is ended at the same time as the engine is stopped. However, even when the engine of the vehicle 10 has stopped, the communication device 124 may be in a standby state. Therefore, it is possible to update the road structure map according to a state of a battery of the vehicle 10, and an urgency of the map update.

First, in a case where information such as the road construction or an accident is acquired in the external server 142, change information on the section where the road construction or the accident has occurred and a road layout changed by the road construction or the accident is distributed from the external server 142 to the vehicle 10 (S202).

The vehicle 10 received the change information analyzes the change information and determines whether or not the change in the section is a temporary change in which the road shape is maintained (for example, determines whether or not a change in the data of the road structure map between before and after the road construction has been generated), in the update process CPU 108 (S204).

Specifically, in a case where the change in the section is a change including, for example, a new road construction, increase or decrease in the number of lanes, a change of a curvature of a curve, a change of a lane, a change of a road markings, or the like, the update process CPU 108 of the vehicle 10 determines that the change is a change accompanying a change of the road shape, that is, the update process CPU 108 of the vehicle 10 determines that the change is not a temporary change of a road constitution (S204: No). The update process CPU 108 of the vehicle 10 downloads the latest version of the road structure map to which details of changes in the section is applied from the external server 142 to update the road structure map in the storage device 106 (S206).

On the other hand, in a case where the change in the section is a change corresponding to a temporary lane limitation due to a pavement update/repair, road surface cleaning, weeding, an accident, or the like, the update process CPU 108 determines that the change is a change in which the road shape is maintained, that is, the temporary change of the road constitution (S204: Yes).

Figure 3:
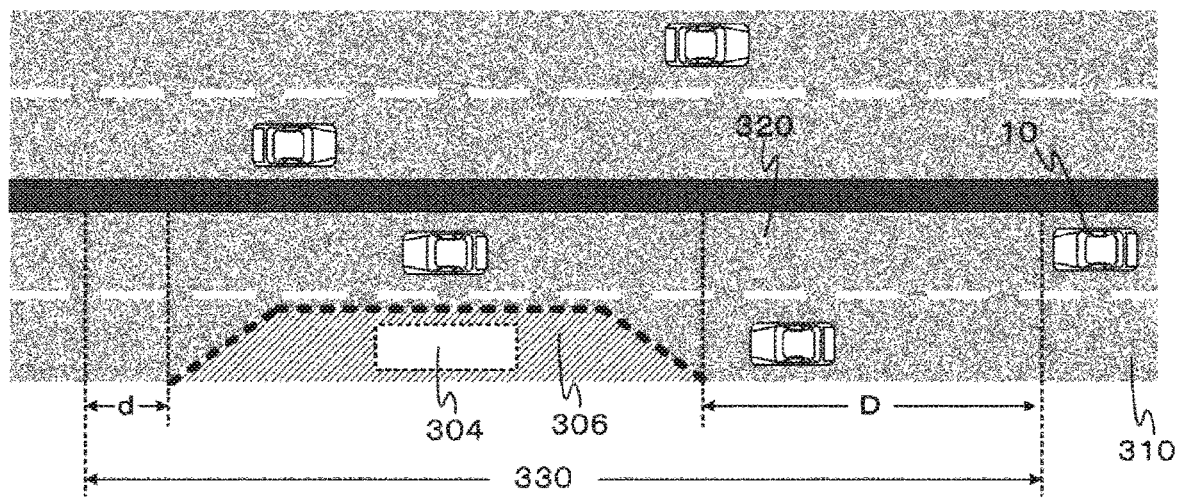
FIG. 3 is a diagram illustrating an example of a road on which the vehicle including the automatic traveling control system according to the embodiment of the present invention is traveling.

FIG. 3 illustrates an example of a road temporarily changed as described above, and illustrates a road including a temporary lane restriction section 306 according to a road construction 304 such as a road surface repair in a traveling lane 310.

The update process CPU 108 of the vehicle 10 which has acquired information on a change in a road environment from the external server 142 as shown in FIG. 3 may determine that a roadwork 304 has not changed the road shape of the traveling lane 310 on the basis of the information, and in addition, may determine that the lane restriction section 306 is in a temporary changed state that has been canceled after completion of the roadwork 304 (S204: Yes) In addition, such temporary restrictions on a road are not limited to the traveling lane restrictions described above. For example, the temporary regulation of the road includes a general traffic regulation such as an overtaking lane regulation, an uphill lane regulation, a road shoulder regulation, an island regulation (a regulation of a center of three or more lanes), traffic control, one-way alternate traffic, and face-to-face traffic.

In a case where such a determination is made, the vehicle 10 does not request an update map related to the lane restriction section 306 from the server 142, and the road structure map stored in the storage device 106 is not updated. On the other hand, since on the road including the land regulation section 306, an actual road structure is different from a road structure of the road structure map stored in the storage device 106, in the next process (S208), a process of limiting part or all of the automatic traveling of the vehicle 10 is executed in the section in which the temporary change occurs.

Specifically, in FIG. 3, in a case where an automatic driving limitation section 330 (a section between a point positioned apart from a start point of the lane restriction section 306 by a predetermined distance D in a backward direction and a point positioned apart from an end point of the land regulation section 306 by a predetermined distance d in a traveling direction) is included in an automatic traveling section of the vehicle 10, for example, a process of limiting the automatic driving of the steering device 130 is executed in the automatic driving limitation section 330.

For example, when the vehicle 10 in which all of an output, a steering, and a braking are automatically driven reaches the start point of the automatic driving limitation section 330 (the point positioned apart from the start point of the lane regulation section 306 by the predetermined distance D in the backward direction), a notification that a process of transferring the steering operation to the driver has started is transmitted to the driver through the display screen of the car navigation system or the speaker mounted on the vehicle 10. In addition, the driver is prompted to manually operate the steering such that the transfer of the steering operation is completed before reaching the land regulation section 306, and the automatic operation of the steering is stopped after the completion of the transfer.

In addition, an automatic driving related to an output and a braking may be continued even after reaching the start point of the automatic driving limitation section 330. For example, the driving device 132 and the braking device 134 are automatically controlled to perform a following traveling where the vehicle 10 travels within a range of a set vehicle speed while keeping a constant distance from a preceding vehicle.

In addition, the present invention is not limited to such an example, for example, at the time when reaching the start point of the automatic driving limitation section 330, all of the operations of the output, the steering, and the braking may be transferred to the driver, and all of the operations may be manually driven. In addition, the predetermined distance D is preferably set to, for example, 2 km or more so that the transfer of the operation to the driver is able to be executed with sufficient tolerance.

In addition, the driver of the vehicle 10 approaching the lane regulation section 306 may perform the steering operation himself of herself so as to travel on an overtaking lane 320 and avoid the lane regulation section 306. On the other hand, the output and the braking of the vehicle 10 are automatically controlled on the basis of results of detecting information from in front of the vehicle 10 by the detection equipment such as the millimeter wave radar 128, the imaging device 120, the distance measuring device 126, and the like.

When reaching the end point of the automatic driving limitation section 330 (the point positioned apart from the end point of the lane regulation section 306 by the predetermined distance d in the traveling direction), in the vehicle 10, a notification of a releasing the limitation of the automatic driving (that is, a notification of returning the manual steering operation to the automatic driving) is executed through the display screen or the like of the car navigation system, and all of the operations are automatically operated again.

In addition, the predetermined distance d may be a value less than the predetermined distance D. For example, it is preferable to set the predetermined distance d to 0.5 km or less.

As described above, even in a case where the vehicle 10 travels in a section where the road configuration is temporarily changed on the road on which the automatic traveling of the vehicle 10 is executed, the automatic traveling control system 100 according to the present embodiment is constituted so as not to execute the update process of the high-precision map with respect to the section and limit at least part of the automatic driving in the section. Therefore, it is possible to reduce a process load in the external server 142, the communication device 124 of the vehicle 10, and the update process CPU 108 due to the update. Accordingly, it is possible to prevent the capability reduction of the update system of the road structure map in advance. In addition, it is possible to greatly reduce the cost of the communication between the server device 142 and the vehicle 10.

Figure 2:
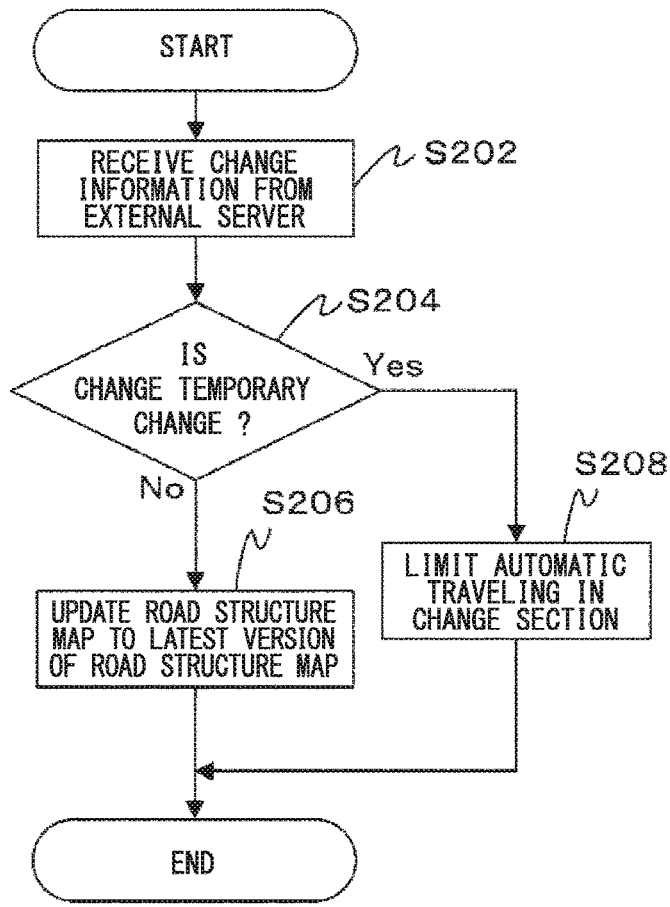
FIG. 2 is a flowchart illustrating an update process procedure of a road structure map executed by the automatic traveling control system according to the embodiment of the present invention.

In addition, in the present embodiment, the processes of S204 to S208 of the process flow illustrated in FIG. 2 are executed in the vehicle 10. However, the present invention is not limited to such an embodiment, and part of such processes may be executed by the external server 142. For example, the external server 142 may determine whether or not the change in the predetermined section is the temporary change. In a case where it is determined that the change is the temporary change, information for instructing the limitation of part or all of the operations of the automatic traveling in the predetermined section may be distributed from the external server 142 to the vehicle 10, and the automatic traveling of the vehicle 10 may be limited on the basis of the distributed information.

As described above, an automatic traveling control system of the present invention includes a vehicle control device configured to control an automatic traveling of a vehicle on the basis of a road structure map stored in a storage device, a reception device configured to receive change information of the road structure map from an outside, and an update device configured to update the road structure map on the basis of the change information. In a case where the change information is information indicating a temporary change of a predetermined section included in the road structure map, the road structure map is not updated and the automatic traveling of the vehicle is limited in the predetermined section.

Therefore, it is possible to reduce a load of the external server, the communication device of the vehicle, the update process CPU, and the like. In addition, it is possible to prevent the capability reduction of the update system of the road structure map in advance. In addition, it is possible to largely reduce the cost of the communication between the server device and the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An automatic traveling control system comprising:
a vehicle control device configured to control an automatic traveling of a vehicle on the basis of a road structure map stored in a storage device;
a reception device configured to receive change information of the road structure map from outside; and
an update device configured to update the road structure map on the basis of the change information;
wherein, in a case where the change information is information indicating a temporary change of a predetermined section included in the road structure map, the road structure map is not updated and the automatic traveling of the vehicle is limited in the predetermined section.

2. The automatic traveling control system according to claim 1,
wherein, in a case where the predetermined section is included in an automatic traveling section of the vehicle, at least part of functions of the automatic traveling is limited so as to be changed to a manual driving before reaching the predetermined section.

3. The automatic traveling control system according to claim 1,
wherein, in a case where the predetermined section is included in an automatic traveling section of the vehicle, after passing the predetermined section and traveling a predetermined distance, the limitation of the automatic traveling is released.

4. The automatic traveling control system according to claim 1,
wherein, in a case where the change information is information indicating a change in a shape of a road in the road structure map, the road structure map is updated on the basis of the change information.

5. A server device that distributes change information of a road structure map to a vehicle including an automatic traveling control system that controls an automatic traveling on the basis of the road structure map,
wherein, in a case where the change information is information indicating a temporary change of a predetermined section included in the road structure map, the server device distributes information for restricting the automatic traveling of the vehicle in the predetermined section.

* * * * *